Jan. 13, 1959

W. J. WILLISON 2,868,333

VEHICLE EMERGENCY BRAKE

Filed Aug. 24, 1956

William J. Willison
INVENTOR.

BY

Jan. 13, 1959

W. J. WILLISON 2,868,333

VEHICLE EMERGENCY BRAKE

Filed Aug. 24, 1956

William J. Willison
INVENTOR.

BY *Clarence A. O'Brien*
*and Harvey B. Jacobson*
Attorneys

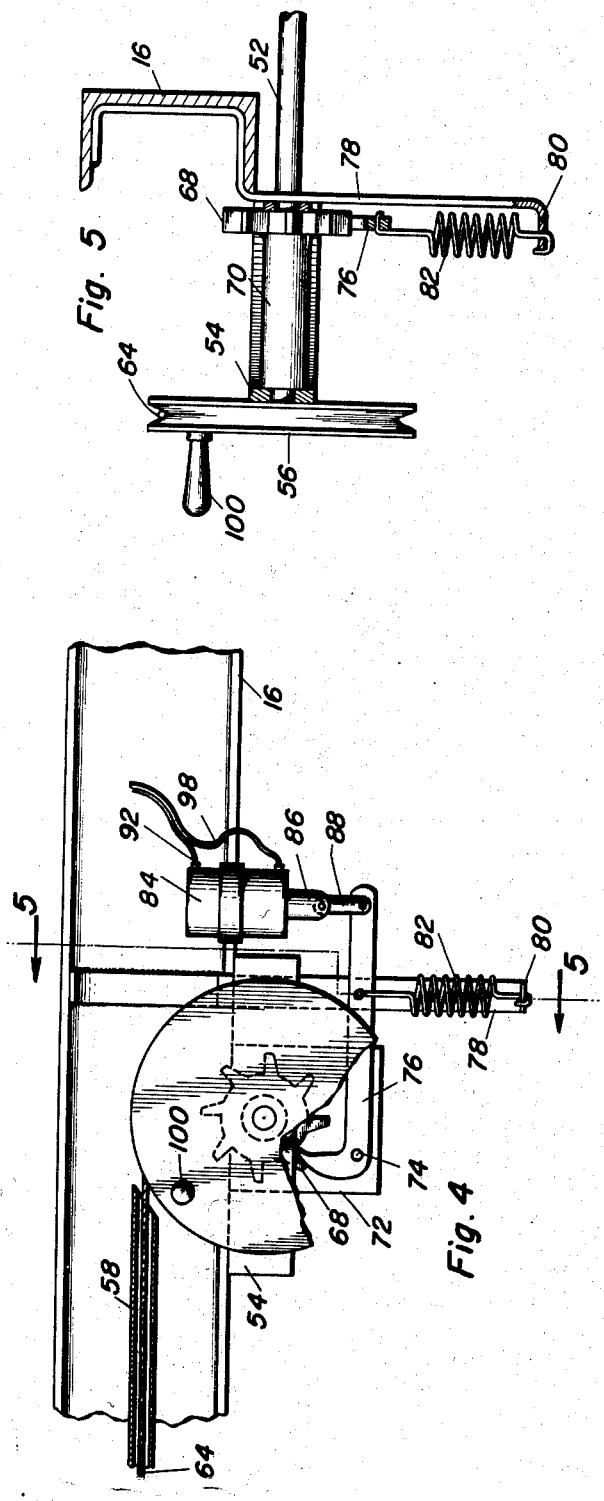

United States Patent Office 2,868,333
Patented Jan. 13, 1959

2,868,333

VEHICLE EMERGENCY BRAKE

William J. Willison, Frostburg, Md., assignor of forty percent to James H. Winebrenner, Eckhart Mines, Md.

Application August 24, 1956, Serial No. 605,974

4 Claims. (Cl. 188—4)

This invention relates in general to new and useful improvements in vehicle brakes, and more specifically to an improved vehicle emergency brake of the drag type.

Although great advancements have been made in vehicle brakes in recent years, particularly in the provision of safety devices, there still remains little that can be done in the event a brake line breaks during the operation of the vehicle. This is particularly true in the case of tractor-trailer trucks where one of the air lines may break or where the compressor may fail at a critical moment in going down a hill. Once this occurs, the vehicle is out of control except for the steering of the vehicle by the operator and the possibility of relying upon the compression of the engine for the slowing down of the vehicle by shifting the vehicle down into one of the lower gear ratios.

It is therefore the primary object of this invention to provide an improved vehicle emergency brake which is separate and independent of the ordinary brake system of the vehicle, including the normal brake lining and brake drums, the emergency brake system being provided with its own operator and being intended to be used only in the event of an emergency.

Another object of this invention is to provide an improved emergency brake system for vehicles, the emergency brake system being of the drag type and including a pair of drag brake elements which are aligned with wheels of the vehicle and which are normally retained in retracted positions, the drag brake members being releasable so as to move beneath a vehicle wheel and present a non-movable body between the vehicle wheels and the road surface so as to in effect cause dragging of the vehicle wheels with respect to the road surface.

Still another object of this invention is to provide an improved vehicle emergency brake of the drag type, the emergency brake being provided with a simple mechanism for retaining drag brake members in retracted positions and being provided with a simple operating mechanism whereby the operation of the vehicle emergency brake may be readily controlled from a cab of a tractor-trailer for operating the brake when mounted on the trailer.

A further object of this invention is to provide an improved means of storing a drag brake member of an emergency brake system, by being provided with a simple receptacle having an open bottom and a cable for effecting the forming of the drag brake member into the receptacle for storage purposes.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 4 is an enlarged fragmentary side elevational view of a portion of the trailer and shows the specific details and the means for controlling the releasing of the drag brake member;

Figure 5 is an enlarged fragmentary sectional view taken substantially upon the plane indicated by the section line 5—5 of Figure 4 and shows further the specific details and the means for controlling the actuation of the drag brake member;

Figure 6 is a wiring diagram of the control for the drag brake member;

Figure 7 is a fragmentary longitudinal sectional view showing the drag brake member in an operative position removed from the receptacle in which it is normally stored; and Figure 8 is a fragmentary longitudinal sectional view similar to Figure 7 and shows the drag brake member in its stored position.

Figure 1:
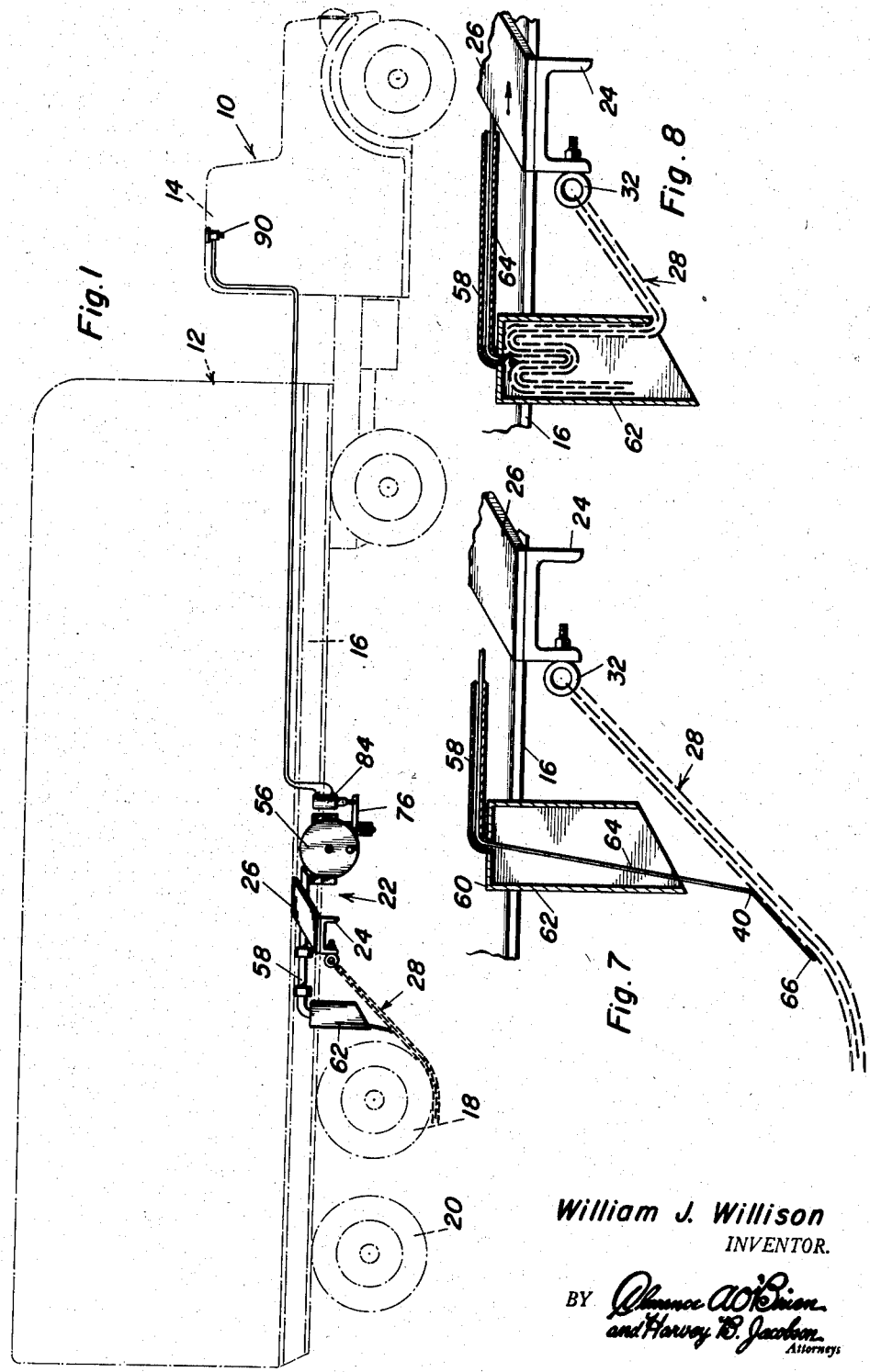
Figure 1 is a side elevational view of a tractor-trailer and shows mounted thereon in an operating position the vehicle emergency brake which is the subject of this invention, the tractor-trailer being shown in phantom lines.
Figure 2:
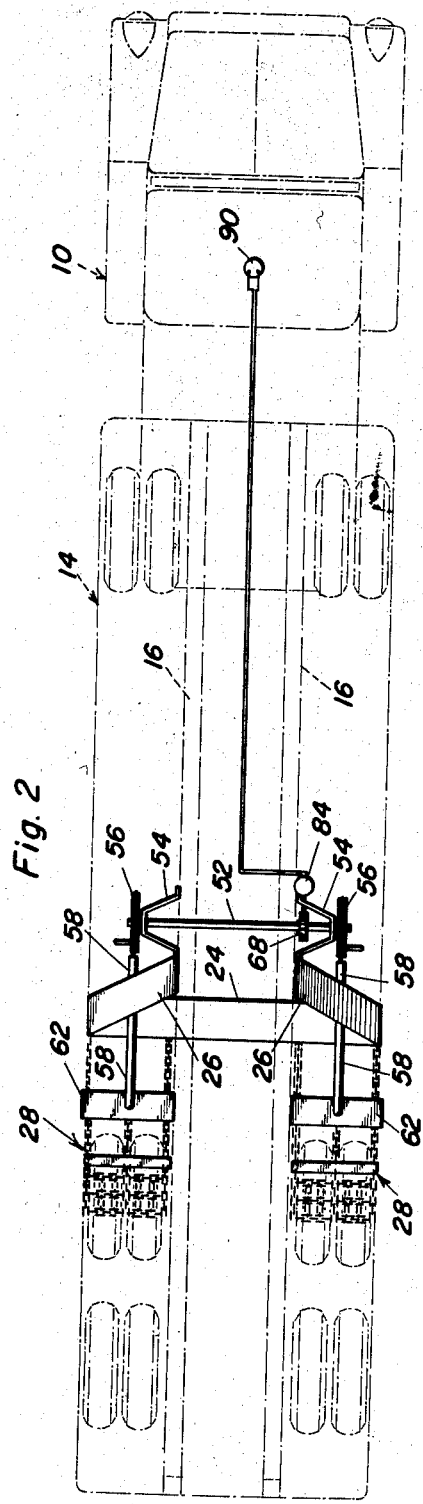
Figure 2 is a top plan view of the tractor-trailer of Figure 1 with the tractor-trailer being shown in phantom lines and the specific details of the emergency brake being shown.

Referring now to the drawings in detail, it will be seen that there is illustrated in Figures 1 and 2 a tractor-trailer combination which includes a tractor 10 and a trailer 12. The tractor 10, among other features, includes a cab 14. The trailer 12, among other features, includes a frame formed of a pair of spaced longitudinally extending frame members 16. The trailer 12 also includes a forward set of rear wheels 18 and a rear set of rear wheels 20.

Mounted on the frame rails 16 of the trailer 12 is the vehicle emergency brake, which is the subject of this invention, the vehicle emergency brake being referred to in general by the reference numeral 22. The vehicle emergency brake 22 includes a transverse anchor member 24 which extends transversely of the trailer 12 and which is secured to the underside of the frame rails 16. The opposite ends of the anchor member 24 are braced by diagonal braces 26. The anchor member 24 extends to opposite sides of the frame rails 16 and has secured to opposite ends thereof drag brake members 28.

Figure 3:
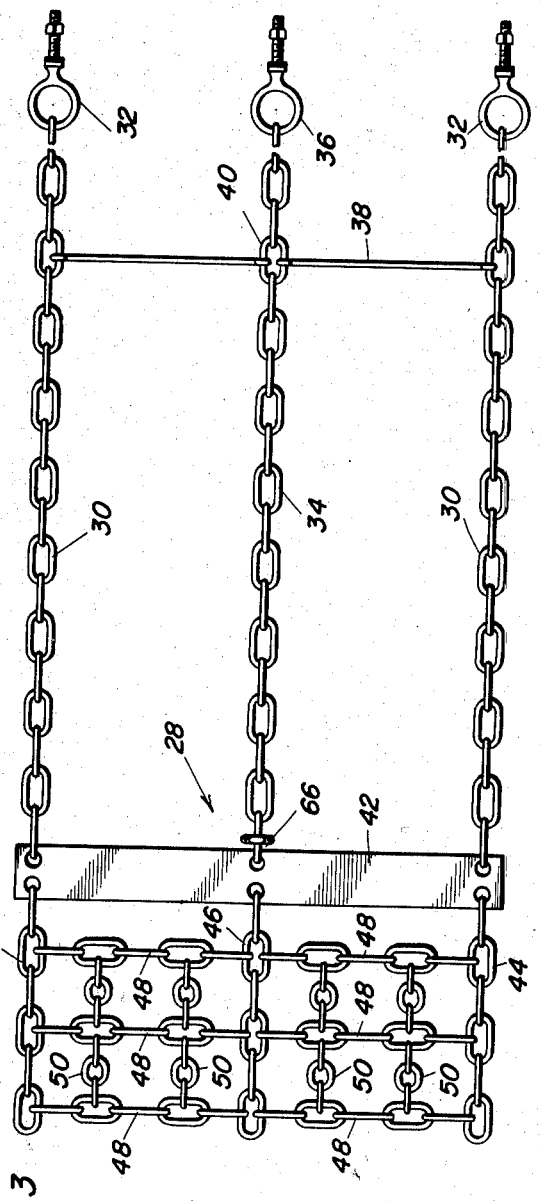
Figure 3 is an enlarged plan view of one of the drag brake members and shows the specific details thereof, the intermediate portion of the drag brake member being omitted.

Referring now to Figure 3 in particular, it will be seen that there is illustrated the details of one of the drag brake members 28. The drag brake member 28 includes a pair of outer longitudinally extending chains 30 which are provided at the forward ends thereof with attaching bolts 32, the attaching bolts 32 being secured to the anchor 24. The drag brake member 28 also includes at least one intermediate longitudinally extending chain 34 which is provided at its forward end with an attaching bolt 36. Intermediate portions of the chains 30 and 34 adjacent the forward ends thereof are connected together by a transversely extending spacer 38. The spacer 38 is provided with a central eye 40 which functions as a guide. The chains 30 and 34 are also connected together intermediate their ends and adjacent the rear portions thereof by a transverse spacer 42. The chains 30 and 34 actually terminate at the spacer 42 and there are provided extensions 44 and 46, respectively, which are secured to the spacer 42 independently of the chains 30 and 34.

The chains 44 and 46 are connected together by transverse chain sections 48 which are, in turn, connected together by longitudinal chain sections 50. The chains 44 and 46 and the chain sections 48 and 50 combine to form a mat which is intended to be disposed between the forward and rear wheels 18 and the road surface, as is best illustrated in Figures 1 and 2.

In order that the drag brake members 28 may be normally stored in out-of-the-way positions, there is provided a transverse shaft 52 which is supported for rotation by a pair of mounting brackets 54. As is best illustrated in Figure 2, the mounting brackets 54 are secured to opposite sides of the frame rails 16 and extend outwardly therefrom. Carried by opposite ends of the shaft 52 are drums 56 which are secured to the shaft 52 for rotation in unison. Aligned with the drums 56 are rearwardly extending guide tubes 58 which are supported by the braces 26 and top walls 60 of receptacles 62. The receptacles 62 are secured to the outer surfaces of the frame rails 16 and are disposed in alignment with the rear wheels 18 of the trailer 12. It is to be noted that the receptacles 62 are of the type which have open bottoms.

Extending through the guide tubes or sleeves 58 are cables 64. The forward ends of the cables 64 are reeled on the drums 56 and the rear portions of the cables 64 pass down through the receptacles 62, through the eyes 40 and are anchored to the chain 34 by an anchor member 66 adjacent the inner section of the chain 34 and the spacer 42.

As is best illustrated in Figure 8, when the cables 64 are in their retracted positions, the drag brake member 28 is folded upon itself and stored within the receptacle 62. On the other hand, when the cables 64 are released, the drag brake member 28 is permitted to move downwardly out of the receptacle 62 and under the forward rear wheels 18 of the trailer 12. Inasmuch as the forward ends of the drag brake members 24 are anchored relative to the trailer 12, once the wheels 18 ride up thereupon, the drag brake member 18 serves as a drag to restrain the wheels 18 from rotating and to provide an efficient brake for the trailer 12 of such a capacity to quickly stop a trailer 12 and the tractor 10.

It is to be understood that the drag brake members 28 will normally be stored. In order to effect the releasing of the drag brake members 28, and at the same time to retain the drag brake members 28 within the receptacles 62, there is secured on the shaft 52 a ratchet wheel 68, the ratchet wheel 68 having a hub 70 mounted on the shaft 52 for rotation therewith. Depending from the adjacent frame rail 16 is a mounting plate 72 which carries a pivot pin 74 on which there is pivotally mounted a dog member 76. The dog member 76 is normally engaged with the ratchet wheel 68 to prevent rotation thereof as well as the rotation the shaft 52 and the drums 56 carried thereby.

Carried by the frame rail 16 adjacent the ratchet wheel 68 is a bracket 78, as is best illustrated in Figure 5, which terminates in a flange 80. Extending between the flange 80 and the intermediate portion of the dog member 76 is a spring 82. The spring 82 serves to retain the dog member 76 in engagement with the ratchet wheel 68.

In order to effect releasing of the ratchet wheel 68, there is secured to the frame rail 16 disposed adjacent the ratchet wheel 68 an electromagnetic device 84. The electromagnetic device 84 includes a retractible plunger 86 which is connected to the dog member 76 by means of the link 88. When the electromagnetic device 84 is actuated, the plunger 86 is moved vertically upwardly, as viewed in Figure 4, and the dog member 76 is pivoted about the pivot pin 74 to a released position out of engagement with the ratchet wheel 68. The shaft 52 and the drums 56 carried thereby are free to rotate to release the drag brake members 28.

The electromagnetic device 84 is controlled by a control switch 90 which is suitably mounted in the cab 14. As is best illustrated in Figure 6, the control switch 90 is directly connected to the electromagnetic device 84 by a first wire 92 and to a battery 94 on the tractor 10 by a second wire 96. A third wire 98 connects the electromagnetic device 84 to the battery 94. Thus, when the switch 90 is moved to a closed position, the electromagnetic device 84 is energized by the battery 94.

Referring once again to Figure 1 in particular, it will be seen that the wires 92 and 98 are relatively long and extend from the tractor cab 14 to the electromagnetic device 84. Inasmuch as the tractor 10 may be separated from the trailer 12, there will be provided some sort of quick releasable attachment intermediate the ends of the wires 98, the attachment not being illustrated. The attachment will normally be incorporated in the same group of couplings as the air hose and the trailer light system.

As is best illustrated in Figure 5, the drums 56 are provided with handles 100 to facilitate the turning thereof. Once the drag brake members 28 have been used, and the normal brake system of the tractor 10 and the trailer 12 has been repaired, in order to again store the drag brake members 28, it is merely necessary to back the trailer 12 so that the wheels 18 move off of the drag brake members 28. Then by turning the drums 56 using the handles 100, the drag brake members 28 may again be stored in their normal positions in the receptacles 62.

From the foregoing description of the emergency brake system which is the subject of this invention, it will be readily apparent that it is extremely simple and yet foolproof. Further, the details of construction thereof are such that it may be readily mounted on existing trailers and may be coupled to the tractor of the tractor-trailer combination in such a manner that the connecting and disconnecting of the tractor and trailer may be accomplished without any additional work upon the driver with the exception of coupling an additional wire assembly through a conventional connector which may be quickly done.

The foregoing is considered as illustrative only of the principles of the invention. Further, since numerous modification and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A vehicle brake of the drag type comprising a drag brake member having a forward end, a rear portion and an intermediate portion, an anchor, means for attaching said anchor to a vehicle, means attaching said forward end to said anchor for alignment with a vehicle wheel, a receptacle disposed rearwardly of said anchor in alignment with said forward end, said receptacle having an open end, retaining means for normally retaining at least said intermediate portion in said receptacle, said retaining means being in the form of a releasable retaining member having one end anchored to the rear end of the central intermediate portion, a drum, an opposite end of said cable being wound upon said drum, control means for controlling operation of said drum.

2. A vehicle brake of the drag type comprising a drag brake member having a forward end, a rear portion and an intermediate portion, an anchor, means for attaching said anchor to a vehicle, means attaching said forward end to said anchor for alignment with a vehicle wheel, a receptacle disposed rearwardly of said anchor in alignment with said forward end, said receptacle having an open end, retaining means for normally retaining at least said intermediate portion in said receptacle, said retaining means being in the form of a releasable retaining member having one end anchored to the rear end of the central intermediate portion, a drum, an opposite end of said cable being wound upon said drum, control means for controlling operation of said drum, said control means including a remote operator.

3. A vehicle brake of the drag type comprising a drag brake member having a forward end, a rear portion and an intermediate portion, an anchor, means for attaching said anchor to a vehicle, means attaching said forward end to said anchor for alignment with a vehicle wheel, a receptacle disposed rearwardly of said anchor in alignment with said forward end, said receptacle having an open end, retaining means for normally retaining at least said intermediate portion in said receptacle, said retaining means being in the form of a releasable retaining member having one end anchored to the rear end of the central intermediate portion, said intermediate portion being provided with a guide adjacent said forward end, said retaining member freely passing through said guide and supporting said drag brake member at at least two points when said intermediate portion is disposed within said receptacle.

4. A vehicle brake of the drag type comprising a drag brake member having a forward end, a rear portion and an intermediate portion, an anchor, means for attaching said anchor to a vehicle, means attaching said forward end to said anchor for alignment with a vehicle wheel, a receptacle disposed rearwardly of said anchor in alignment with said forward end, said receptacle having an open end, retaining means for normally retaining at least said intermediate portion in said receptacle, said retaining means being in the form of a releasable retaining member having one end anchored to the rear end of the central intermediate portion, a drum, an opposite end of said cable being wound upon said drum, control means for controlling operation of said drum, said control means including a ratchet wheel connected to said drum, a dog engaged with said ratchet wheel, and an electromagnetic operator for said dog.

References Cited in the file of this patent

UNITED STATES PATENTS

| | | |
|---|---|---|
| 646,906 | Hart | Apr. 3, 1900 |
| 1,023,682 | Reno | Apr. 16, 1912 |
| 2,718,283 | Ropp | Sept. 20, 1955 |
| 2,818,939 | Benn | Jan. 7, 1958 |